United States Patent
Nakano et al.

(10) Patent No.: US 7,672,773 B2
(45) Date of Patent: Mar. 2, 2010

(54) TRANSIENT ENGINE PERFORMANCE ADAPTATION METHOD AND SYSTEM

(75) Inventors: Yutaka Nakano, Tokyo (JP); Yasunori Urano, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 11/791,644

(22) PCT Filed: Dec. 1, 2005

(86) PCT No.: PCT/JP2005/022081

§ 371 (c)(1),
(2), (4) Date: Mar. 19, 2008

(87) PCT Pub. No.: WO2006/059682

PCT Pub. Date: Jun. 8, 2006

(65) Prior Publication Data

US 2008/0306671 A1  Dec. 11, 2008

(30) Foreign Application Priority Data

Dec. 3, 2004  (JP) .............................. 2004-351008

(51) Int. Cl.
 G06F 11/30  (2006.01)
 G06F 19/00  (2006.01)
(52) U.S. Cl. ...................................... 701/102; 702/182
(58) Field of Classification Search ......... 702/182–185;
 700/26; 701/99–110
See application file for complete search history.

(56) References Cited

U.S. PATENT DOCUMENTS

| 6,697,693 | B2 | 2/2004 | Hagiwara et al. |
| 7,219,040 | B2 * | 5/2007 | Renou et al. ................... 703/6 |
| 7,299,137 | B2 * | 11/2007 | Bartley et al. ................. 702/34 |
| 7,415,389 | B2 * | 8/2008 | Stewart et al. .............. 702/185 |
| 2003/0120410 | A1 * | 6/2003 | Cari et al. ...................... 701/54 |
| 2004/0128058 | A1 * | 7/2004 | Andres et al. ............... 701/114 |
| 2004/0249558 | A1 * | 12/2004 | Meaney ...................... 701/115 |

FOREIGN PATENT DOCUMENTS

| JP | 5-288115 | 11/1993 |
| JP | 9-15103 | 11/1997 |
| JP | 11-326135 | 11/1999 |
| JP | 2002-245092 | 8/2002 |
| JP | 2002-304438 | 10/2002 |
| JP | 2003-108614 | 4/2003 |
| JP | 2005-90353 | 4/2005 |

* cited by examiner

*Primary Examiner*—Thomas N Moulis
(74) *Attorney, Agent, or Firm*—Smith, Gambrell & Russell, LLP

(57) ABSTRACT

The present invention makes it possible to cope with a plurality of standardized transient operation modes in a method for adapting the engine transient characteristic to a required performance targets and a system therefore. When there are a plurality of prescribed standardized transient operation modes, transient testing is conducted in a single transient operation mode that covers changing patterns of control values of control factors of the plurality of transient operation modes. Only data in a data distribution range to be focused on is captured to create a transient engine model.

4 Claims, 7 Drawing Sheets

TRANSIENT ENGINE PERFORMANCE ADAPTATION METHOD AND SYSTEM

TECHNICAL FIELD

The present invention is used for the transient testing of engines (internal combustion engines). In particular, the present invention relates to a transient testing method used for adapting the transient characteristics and performance of diesel engines to the required performance targets and a system for the same. The present invention is designed to quickly build an engine control system satisfying the transient performance targets of an engine.

BACKGROUND ART

The term "transient characteristics of an engine" refers not to the steady state, in which the speed and torque remain constant, but to characteristics obtained in cases, in which they change with time. For instance, it refers to engine characteristics in states, in which the speed etc. changes, such as during acceleration or during deceleration.

The measurement of output characteristics of a conventional engine, such as the torque output, exhaust, etc., in the transient states of the engine has been conducted using a technique, in which an actual engine is brought into the steady state, the output state of the engine is subjected to measurement, and the output of the engine is then estimated by substitution with transient state characteristics obtained by weighting the steady-state output data.

However, the measurement of steady-state engine characteristics has been a time consuming procedure in which after making changes to the control value of a control factor (e.g. the quantity of injected fuel, fuel injection timing, etc.) of an engine one would wait until a predetermined time (e.g. 3 minutes) passes before the steady state is reached and then measure the output in this state, where one would make changes to the control value of one control factor, conduct measurements upon lapse of a predetermined time after reaching the steady state, and then again make changes to the control value of a control factor and conduct measurements, etc.

Incidentally, in an actual vehicle, during travel, the engine spends more time in a state of acceleration or deceleration and less time in a state permitting travel at a constant speed. For this reason, it is important to measure engine characteristics in transient states. In addition, in recent years, exhaust-related regulations have been directed not at regulation based on the steady-state exhaust values of an engine, as was done before, but at regulation based on regulatory values related to the transient-state exhaust of an engine. Consequently, it has become important to measure transient characteristics that define what kind of transient state exhaust is obtained when certain changes are made to certain control factors.

Incidentally, even during steady-state measurement, which was conducted, as described above, in order to determine what kind of output would be obtained if changes were made to the control factors of an engine in the steady-state, there were numerous control factors, with a particularly large number of control factors appearing when engine control was carried out by means of ECU-based electronic control, as a result of which the length of the test increased. For instance, parameters were added for various types of electronic control involved in engine control, such as EGR (Exhaust Gas Recirculation) valve control or VGT (Variable Geometry Turbo) control. During transient characteristics measurement, in a state in which the engine speed (rotational speed) and torque vary in the form of a time series, it is natural that the output data, likewise, appear as data varying in the form of a time series, as a result of which the number of control factors increases and the length of the test grows exponentially if measurements are attempted in the steady state by making changes to the control values of every single control factor.

For this reason, technology has been proposed, in which engine control etc. is evaluated using simulation virtually reproducing the characteristics of the engine and the vehicle (see Patent Document 1).

In this technology a virtual vehicle model, complete with an engine, is created for each vehicle type in a simulator in advance, whereupon various control inputs, for instance, control values for the throttle aperture, crank angle, and other control factors, are inputted into the vehicle model, and an attempt is made to estimate engine speed, vehicle speed, and exhaust temperature sensor values as outputs of the virtual vehicle model based on the inputted control values.

Because the number of control factors used in an engine has increased in recent years, when measurement of steady state and transient state characteristics is attempted in a real engine, as described above, it takes a long time to obtain test data, which has become a bottleneck in engine development.

In addition, the technique consisting in deploying a vehicle model, including a virtual engine model, in a simulator and using it to observe the behavior of the engine is useful in terms of allowing for reductions in the length of engine development. However, in the above-described Patent Document 1, the object is to build a simulation of a vehicle model and not to create a simulation of transient state phenomena in an engine and use it to evaluate required performance in the transient states of the engine. In addition, poor operability in making changes to the control values has been a problem in case of making changes to the control values of the respective control factors of an engine according to the transient state and estimating their results.

MEANS FOR SOLVING PROBLEM

In order to address the above problem, the present applicant proposed a method as described below (see Patent Document 2). That is, when a transient engine model (simulator) describing the relationship between engine output and input is created by conducting testing in a real engine in transient states, in which the rotational speed, torque, etc. of the engine vary in the form of a time series, capturing output data as a result of the testing and establishing correspondence relationships with the control values of the control factors supplied to the engine, during transient testing in a real engine, an engine is operated in a transient mode by making changes to the control value of a single control factor of the engine, a combination of two factors, or a combination of a greater number of multiple control factors so as to capture the necessary data.

In the method disclosed in Patent Document 2, the created transient engine model is used to conduct a simulation to determine which changes should be made to the control value of a certain control factor to satisfy the performance targets and to acquire control values satisfying the performance targets. The acquired control values are then used to conduct transient testing using a real engine to confirm whether the performance targets are satisfied. When output data satisfying the targets is obtained, a control logic for an engine control circuit (ECU) is created based on the control values used in the simulation of the transient engine model.

[Patent Document 1] JP H11-326135A
[Patent Document 2] JP 2005-090353A

DISCLOSURE OF INVENTION

Problem to be Solved by the Invention

In the above described Patent Document 2, when transient testing using a real engine is conducted, a prescribed standardized transient operation mode is used. Examples of such standardized transient operation mode include JEO5 (test mode according to new Japanese long-term regulation on exhaust gas emissions), FTP (Federal Test Procedure Transient Cycle; test mode employed in the United States), ETC (European Transient Cycle; test mode employed in Europe) and the like.

JEO5 defines a standard travel pattern based on general travel conditions in Japan, and provides a travel pattern in which a vehicle starts traveling, travels on the city streets through acceleration and deceleration, and then travels on the express way.

The travel pattern defined by FTP is based on traveling in a high speed range, since a vehicle often drives on the express way in the United States.

ETC defines a travel pattern, which puts significant emphasis on traveling in a medium speed range.

In this manner, when there are a plurality of standardized transient operation modes, it is required to create transient engine models that cope with all of such standardized transient operation modes. For example, in order to create ECU for engines to be marketed in Japan, the Unites States and Europe, it is necessary to create transient engine models by sequentially inputting conditions of the respective transient operation modes, JEO5, FTP and ETC to the transient engine performance adaptation device, which consumes huge amounts of time.

Also, in order to reduce the required time, it is necessary to prepare three transient engine performance adaptation devices so that three types of transient engine models are created in parallel by these devices, which requires the enormous cost.

The present invention is achieved in view of the above, and the object thereof is to provide transient engine performance adaptation methods and systems that can cope with a plurality of standardized transient operation modes.

An aspect of the present invention is a transient engine performance adaptation method executing the steps of: conducting transient testing, during which an engine is operated in a transient state by making changes to control values of control factors supplied to the engine and its output is captured; capturing engine output data produced by the transient testing and creating a transient engine model of the tested engine based on the relationship between the output data and data concerning the control factors supplied to the engine; obtaining control values of control factors that satisfy transient performance targets required of said engine, using the transient engine model that has been created; confirming whether the required transient performance targets are satisfied by conducting transient testing by supplying the control values obtained from the transient engine model to the real engine; and creating control software for a control circuit controlling the engine if the confirmation step finds that the required transient performance targets are satisfied.

The characteristics of the present invention is that the transient performance targets are set on a condition that the step of conducting the transient testing is executed by changing control values of the control factors in accordance with a prescribed standardized transient operation mode, and the step of conducting the transient testing is executed, when there are a plurality of the prescribed standardized transient operation modes, in a single transient operation mode that covers changing patterns of control values of the control factors of the plurality of transient operation modes.

As a result, even when there are a plurality of prescribed standardized transient operation modes, conducting the transient testing using a real engine can be completed in only one process. Therefore, the time required for transient engine performance adaptation can be reduced to a large extent.

Also, for each of the plurality of transient operation modes, a data distribution range to be focused on of the engine output data produced by the transient testing is specified, and it is possible for the step of creating a transition engine model to execute a step of capturing only data in the data distribution range to be focused on.

Specifically, the transition testing using a real engine is conducted in a single transient operation mode that covers all the plurality of prescribed standardized transient operation modes. Therefore, the resultant output data includes data other than that required by each standard.

Accordingly, when the transition engine model is created, the transition engine model can be created with good efficiency by capturing only data in the data distribution area to be focused on, without capturing unnecessary data.

A second aspect of the present invention is a transient engine performance adaptation system including real engine transient test execution means for conducting transient testing by making changes to control values of control factors of an engine; transient engine model creation means for capturing engine output data obtained by the transient testing and creating a transient engine model describing the relationship between control input and the output data of the engine based on said output data and the control values supplied to said engine by the real engine transient test execution means; transient engine model simulation means for obtaining control values of the control factors, at which the transient engine model satisfies transient performance targets required of the engine during transient testing, using the transient engine model created by the transient engine model creation means; and means for supplying the real engine transient test execution means with the engine control values satisfying the transient performance targets obtained by conducting the simulation using the simulation means.

Here, the characteristics of the present invention is that the transient performance targets are set on a condition that the real engine transient test execution means conducts transient testing by changing control values of the control factors in accordance with a prescribed standardized transient operation mode, and the real engine transient test execution means is provided with means for conducting, when there are a plurality of the prescribed standardized transient operation modes, the transient testing in a single transient operation mode that covers changing patterns of control values of the control factors of the plurality of transient operation modes.

Also, for each of a plurality of transient operation modes, a data distribution range to be focused on in the engine output data produced by the transient testing is specified, and it is possible for the transient engine model creation means to be provided with means for capturing only data in the data distribution range to be focused on.

EFFECTS OF THE INVENTION

With the present invention, it is possible to achieve transient engine performance adaptation methods and systems that can cope with a plurality of standardized transient operation modes.

DESCRIPTION OF REFERENCE NUMERALS

Figure 1:
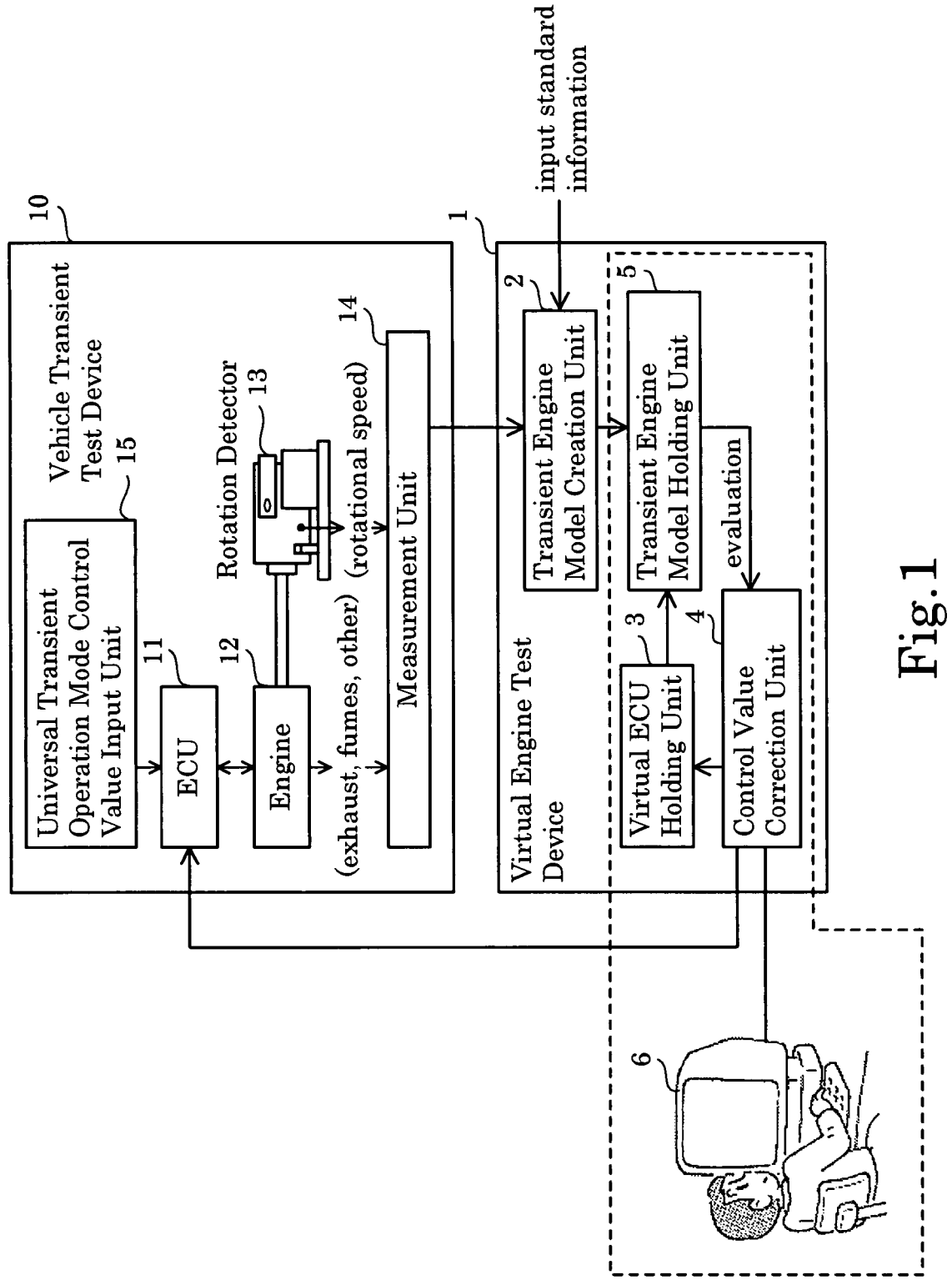
FIG. 1 is a diagram illustrating the system configuration of the present embodiment.

1. Virtual engine test device
2. Transient engine model creation unit
3. Virtual ECU holding unit
4. Control value correction unit
5. Transient engine model holding unit
6. Operator terminal
10. Vehicle transient test device
11. ECU
12. Engine
13. Rotation detector
14. Measurement unit
15. Universal transient operation mode control value input unit
20. Filter unit
21. Data obtaining unit
22. Model creation unit
23. Data distribution information holding unit

BEST MODE FOR CARRYING OUT THE INVENTION

A configuration of the transient engine performance adaptation system of the present embodiment is described with reference to FIGS. 1 and 2.

An embodiment of the present invention, as illustrated in FIG. 1, is a transient engine performance adaptation system equipped with vehicle transient test device 10 for conducting transient testing by making changes to the control values of the control factors of ECU 11 that controls engine 12, as well as with transient engine model creation unit 2 for capturing output data of engine 12 produced by the transient testing and creating a transient engine model describing the relationship between the control input and the output data of engine 12 based on said output data and control values that vehicle transient test device 10 supplies to ECU 11 of engine 12, virtual ECU holding unit 3 operating as transient engine model simulation means using the transient engine model created by transient engine model creation unit 2 to obtain the control values of the control factors, at which the transient engine model satisfies the transient performance targets required of engine 12 during transient testing, control value correction unit 4, transient engine model holding unit 5, and operator terminal 6, and means for supplying vehicle transient test device 10 with engine control values satisfying the transient performance targets obtained by conducting the simulation using the transient engine model simulation means.

Here, the characteristics of the present embodiment is that the transient performance targets are set on the condition that vehicle transient test device 10 conducts transient testing by changing the control values of the control factors in accordance with a prescribed standardized transient operation mode, and that vehicle transient test device 10 is provided with universal transient operation mode control value input unit 15 for conducting, when there are a plurality of the prescribed standardized transient operation modes, the transient testing in a single universal transient operation mode that covers modification patterns of the control values of the control factors of these transient operation modes.

Figure 2:
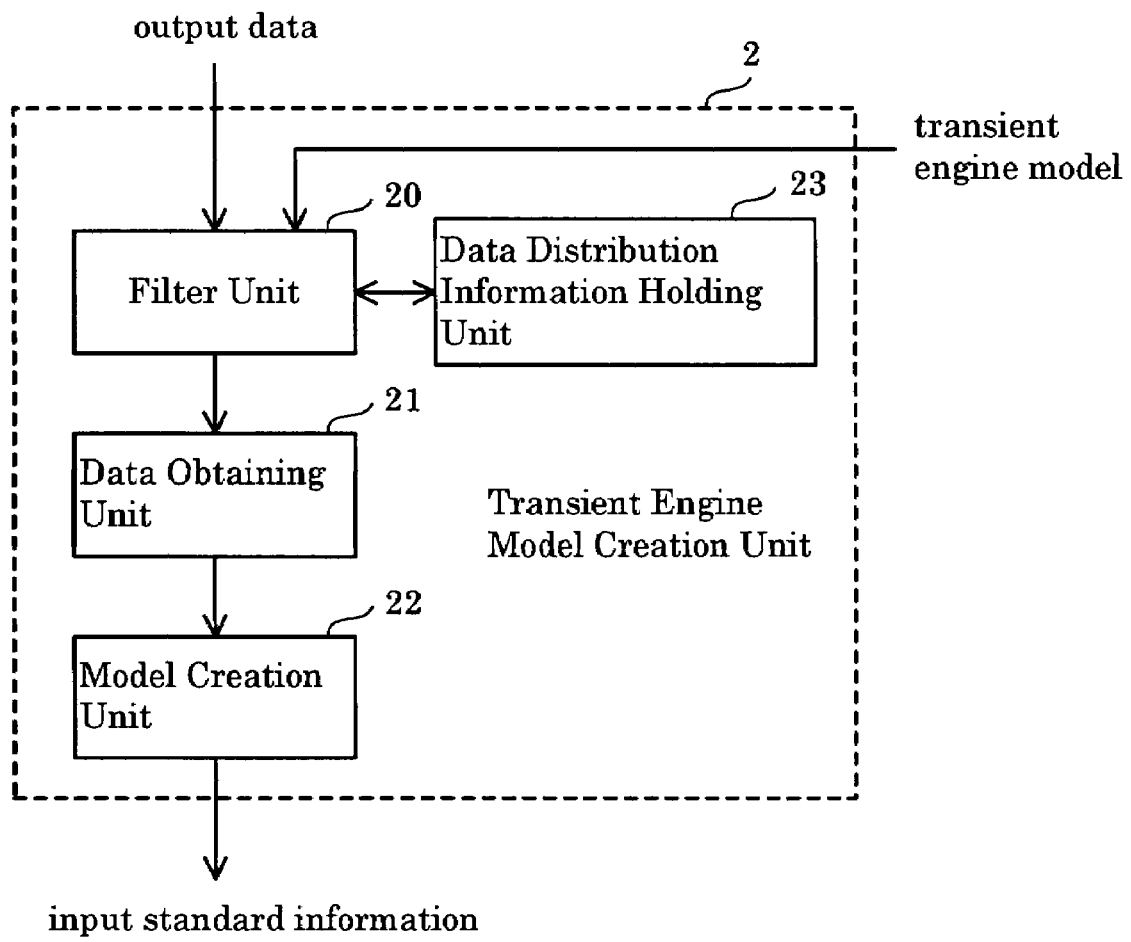
FIG. 2 is a block diagram of a transient engine model creation unit of the present embodiment.

Also, as shown in FIG. 2, for each of a plurality of transient operation modes, the data distribution range to be focused on in the engine output data produced by the transient testing is specified, and transient engine model creation unit 2 is provided with filter unit 20 for capturing only data in the data distribution range to be focused on, and data distribution information holding unit 23 and data obtaining unit 21.

Figure 3:
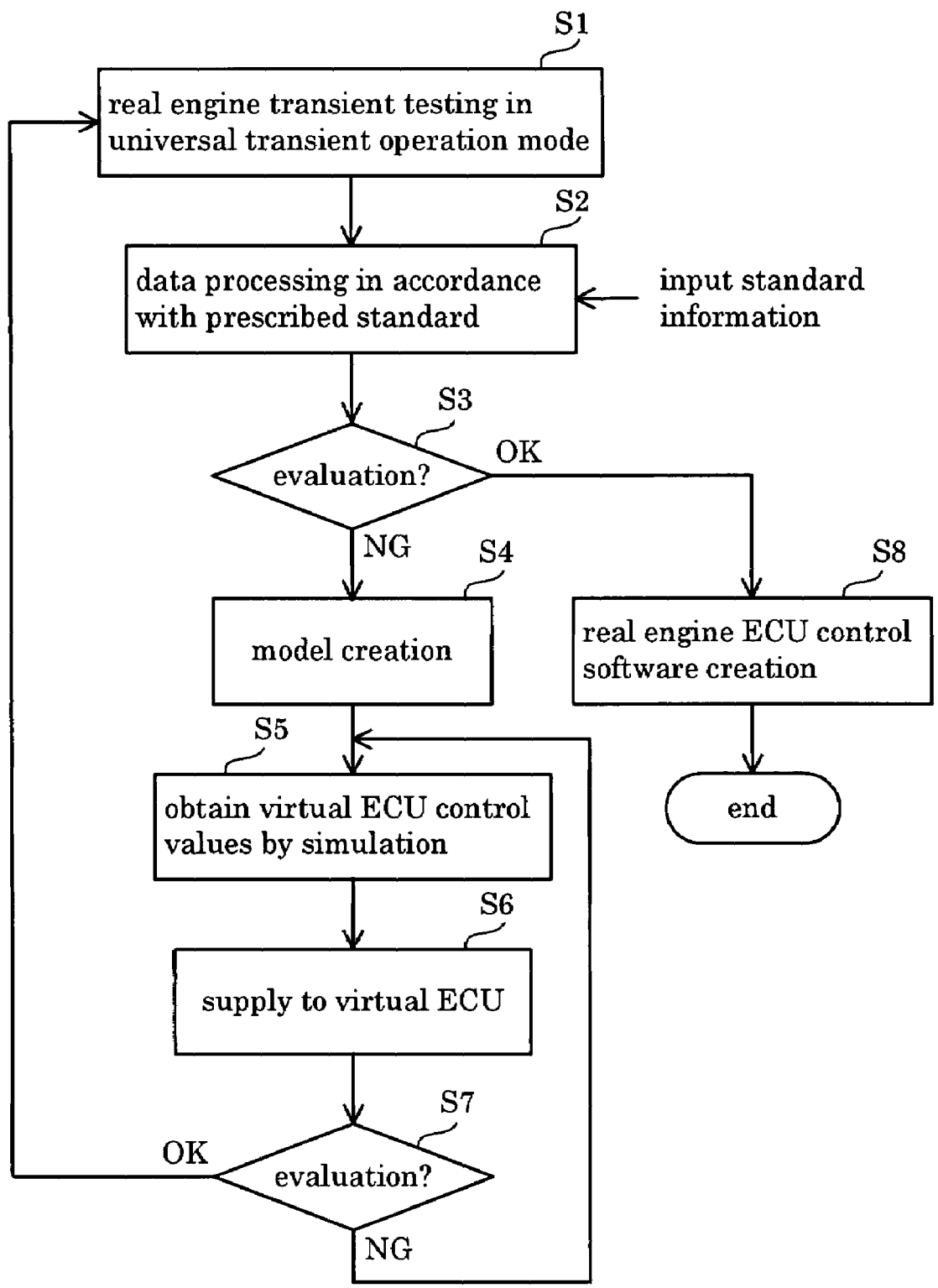
FIG. 3 is a flow chart illustrating the operation of the present embodiment.

Then, the transient engine performance adaptation method of the present embodiment is described with reference to FIGS. 3 and 4.

The transient engine performance adaptation method can be carried out using the transient engine performance adaptation system shown in FIGS. 1 and 2. Specifically, as illustrated in FIG. 3, the present embodiment is a transient engine performance adaptation method comprising the steps of conducting transient testing, during which engine 12 is operated in a transient state by making changes to the control values of the control factors supplied to ECU 11 of engine 12 and its output is captured (S1); capturing output data of engine 12 produced by the transient testing and creating a transient engine model of the tested engine 12 based on the relationship between the output data and data concerning the control factors supplied to ECU 11 of engine 12 (S2 to S4); obtaining control values of the control factors that satisfy the transient performance targets required of engine 12, using the transient engine model that has been created (S5); confirming whether the required transient performance targets are satisfied by conducting transient testing by supplying the control values obtained from the transient engine model to real engine 12 (S6 and S7); and creating control software for an ECU controlling engine 12 if the confirmation Step S7 finds that the required transient performance targets are satisfied (S8).

Here, the characteristics of the present embodiment is that the transient performance targets are set on the condition that Step S1 for conducting the transient testing is executed by changing the control values of the control factors in accordance with a prescribed standardized transient operation mode, and that Step S1 for conducting the transient testing is executed, when there are a plurality of the prescribed standardized transient operation modes, in a single universal transient operation mode that covers modification patterns of the control values of the control factors of these transient operation modes.

Figure 4:
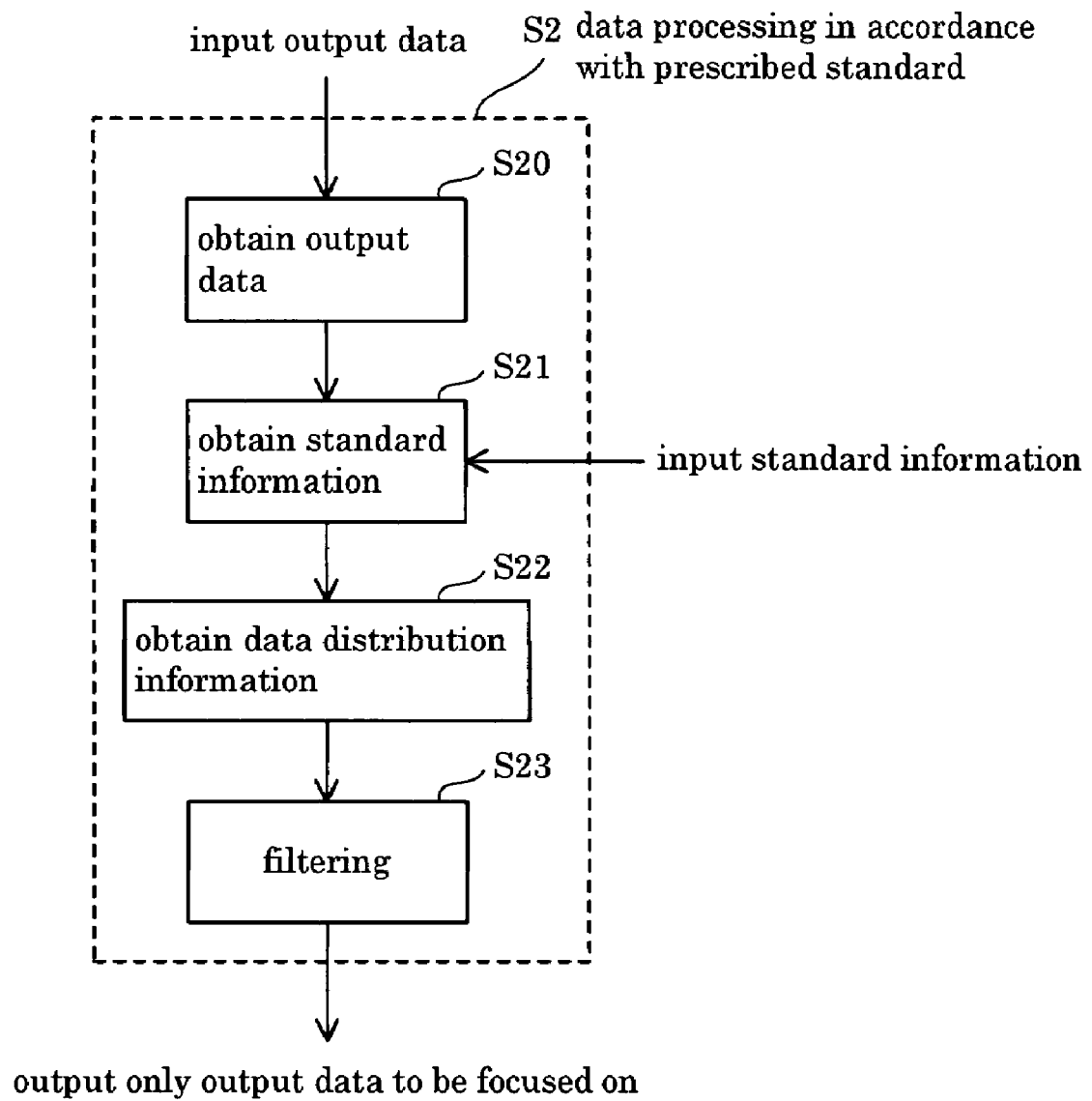
FIG. 4 is a flow chart illustrating data processing procedure in accordance with a prescribed standard of the present embodiment.

Also, for each of a plurality of transient operation modes, the data distribution range to be focused on in the output data of engine 12 produced by the transient testing is specified, and as shown in FIG. 4, Steps S2 to S4 for creating the transition engine model executes Steps S20 to S23 for capturing only data in the data distribution range to be focused on.

Figure 5:
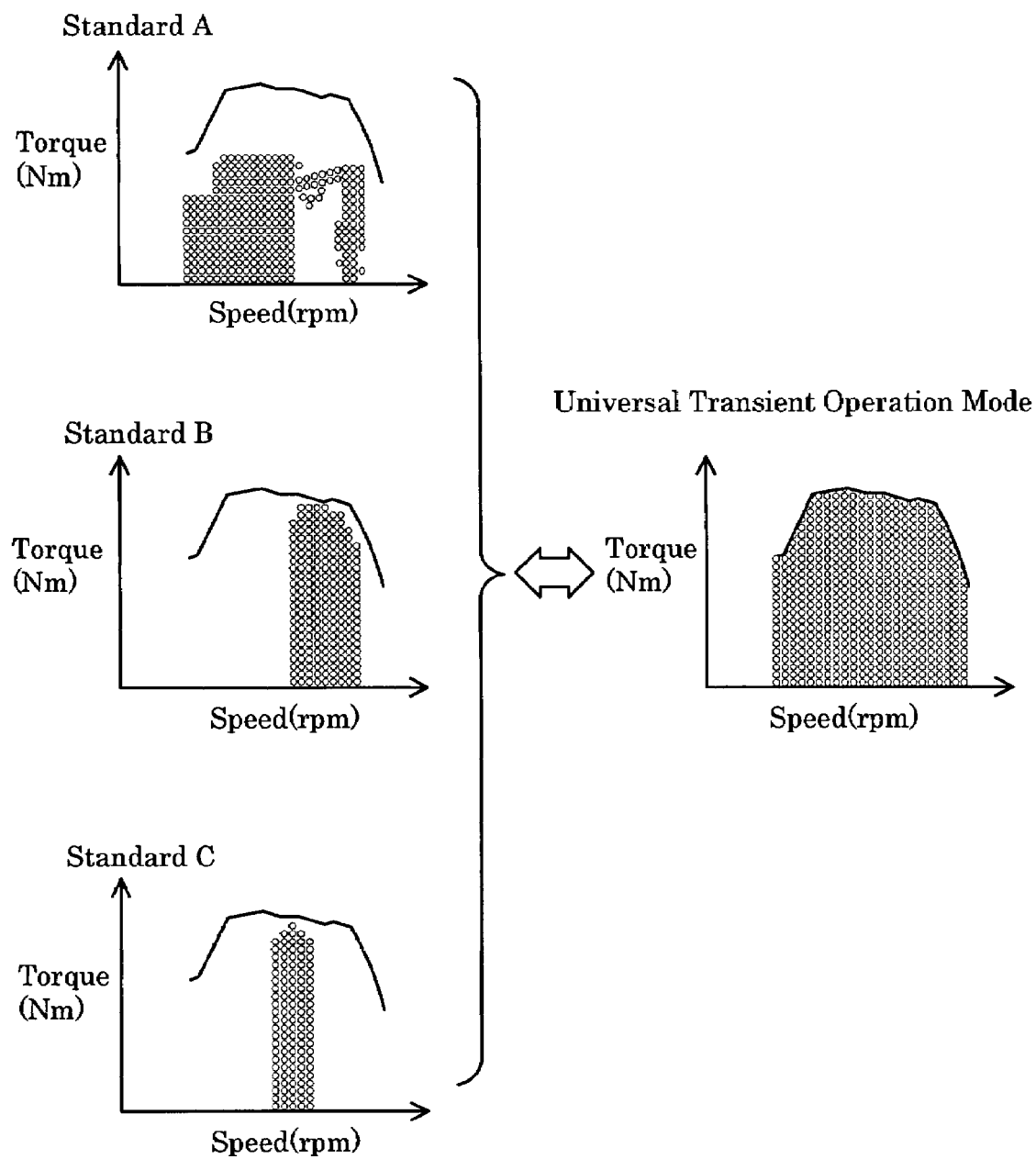
FIG. 5 is a diagram describing a universal transient operation mode.

Here, the universal transition operation mode is described with reference to FIG. 5. FIG. 5 shows the relationship between the universal transient operation mode and each of prescribed standardized transient operation modes A to C. In each graph in FIG. 5, the horizontal axis indicates the engine speed (rpm), and the vertical axis indicates the torque (Nm). The circles in the graphs indicate sampling points, which show the correspondence between the engine speed and the torque during operation for each standardized transient operation mode.

In Standard A, the engine is operated over an entire range from a low torque to a high torque in a comparatively low speed range. In a comparatively high speed range, the engine is operated over a range from a low torque to a medium torque. This assumes JE05 standard, which defines a travel pattern in which a vehicle starts traveling, travels on the city streets through acceleration and deceleration, and then on the express way. That is, the engine is operated over an entire range from a low torque to a high torque in a comparatively low speed range when the vehicle travels on the city streets through acceleration and deceleration. When the vehicle travels on the express way, the engine is operated over a range from a low torque to a medium torque in a comparatively high speed range.

In Standard B, the engine is operated over a range from a low torque to a high torque mainly in a high speed range. This assumes FTP standard, which defines a travel pattern in which a vehicle travels on the express way.

In Standard C, the engine is operated over a range from a low torque to a high torque mainly in a medium speed range. This assumes ETC standard.

The universal transient operation mode satisfies all the transient operation modes of these Standards A, B and C, in which the engine is operated from a low speed to a high speed, and at the same time from a low torque to a high torque, within the possible operation range of the engine (the solid lines in FIG. 5 indicate the upper limit of the possible operation range).

With the real engine transient testing conducted in the universal transient operation mode, it is possible to obtain output data that covers a plurality of Standards A, B and C.

In addition, in terms of creation of a transient engine model by transient engine model creation unit 2, it is possible to minimize the required time for creating transient engine models, since the transient engine models can be created based on the minimum required output data.

Specifically, Standard A requires the output data over a range from a low torque to a high torque in a comparatively low speed range, as well as the output data over a range from a low torque to a medium torque in a comparatively high speed range. Standard B requires the output data over a range from a low torque to a high torque mainly in a high speed range. Standard C requires the output data over a range from a low torque to a high torque mainly in a medium speed range.

Accordingly, as shown in FIG. 2, filter unit 20 and data distribution information holding unit 23 are provided such that the necessary portion and unnecessary portion of the output data is separated for each of Standards A, B and C. Data obtaining unit 21 obtains only the necessary portion of the output data, and model creation unit 22 creates transient engine models in accordance with each of Standards A, B and C based on the minimum required output data. As a result, it is possible to minimize the required time for creating transient engine models that correspond to Standards A, B and C.

Figure 6:
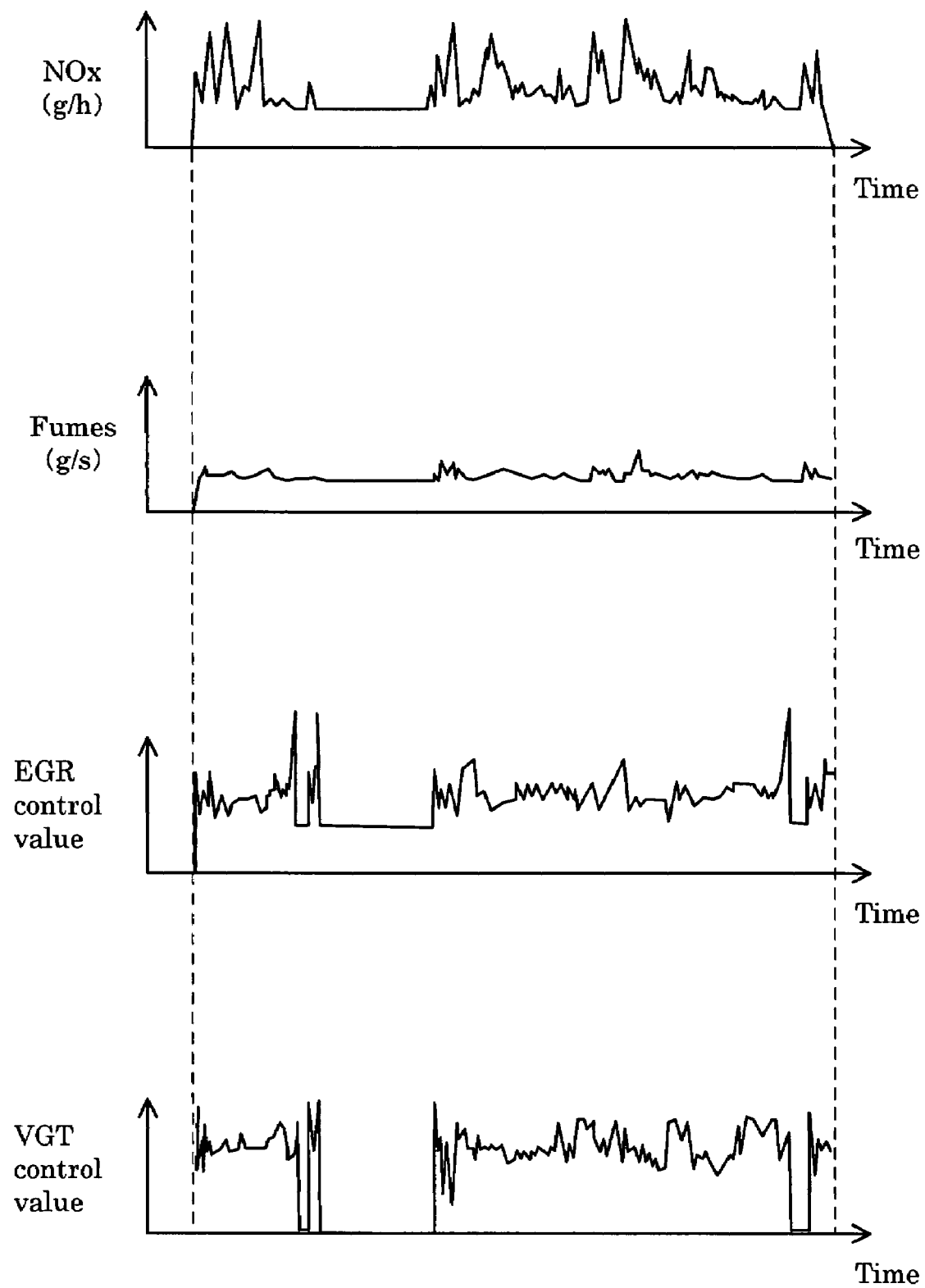
FIG. 6 is a diagram illustrating observation values obtained by real engine transient testing in the present embodiment.
Figure 7:
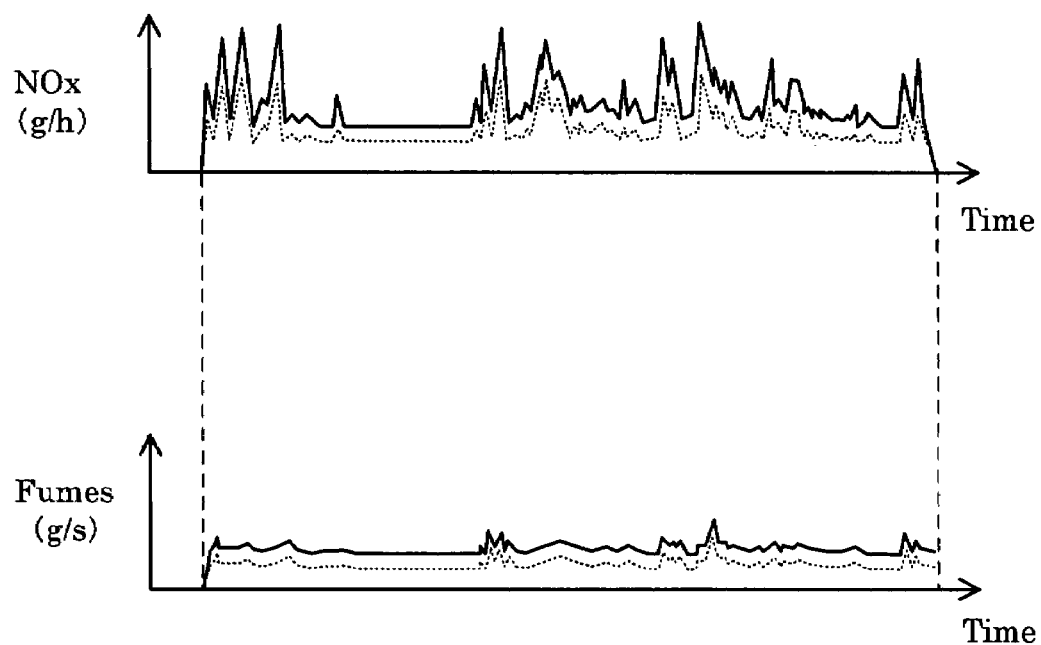
FIG. 7 is a diagram illustrating virtual observation values and target values of the present embodiment.
Figure 8:
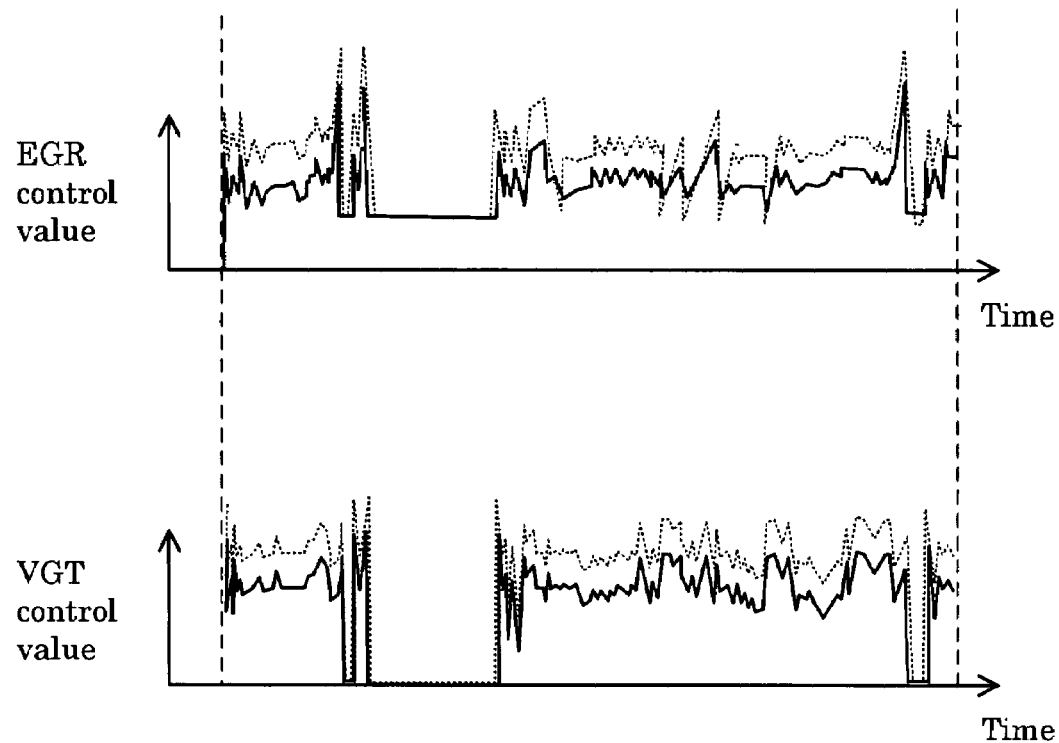
FIG. 8 is a diagram illustrating current control values and target control values of the present embodiment.

Next, explanations are provided regarding the determination procedure of the control values of ECU 11 by referring to FIGS. 6 to 8. FIG. 6 shows the results of the transient characteristic measurements of engine 12 in vehicle transient test device 10. In the present embodiment, the number of grams of $NO_x$ per hour (g/h) and the number of grams of fumes per second (g/s) are plotted along the respective Y-axis and time is plotted along the X-axis. In addition, VGT control values and EGR control values used in this state are plotted along the respective Y-axis and time is plotted along the X-axis. The measurements are conducted in the configuration illustrated in FIG. 1 by measurement unit 14 of vehicle transient test device 10. Also, in the flow chart illustrated in FIG. 3, this corresponds to real engine transient testing in the universal transient operation mode (Step S1) and data processing in accordance with a prescribed standard (Step S2).

A model is created next. In the configuration illustrated in FIG. 1, this is done by transient engine model creation unit 2 of virtual engine test device 1. Also, in the flow chart illustrated in FIG. 3, this corresponds to model creation (Step S4). Because observation results obtained for a real engine are substituted into the transient engine model "as is" in the initial stage of model creation, the transient engine model is created based on the transient characteristic measurement results illustrated in FIG. 6. The transient engine model is held in transient engine model holding unit 5. Also, a virtual ECU for controlling the transient engine model is created and held in virtual ECU holding unit 3.

Control values for the model are created next. In the configuration illustrated in FIG. 1, this is done by control value correction unit 4 of virtual engine test device 1. Also, in the flow chart illustrated in FIG. 3, this corresponds to obtaining virtual ECU control values by means of simulation (Step S5), supplying them to the virtual ECU (Step S6), and conducting evaluation (Step S7). FIG. 7 illustrates the target values (dotted line) for the virtual observation values (solid line) for $NO_x$ and fumes, respectively. In FIG. 7, the result of the evaluation (Step S7) is NG because the difference between the virtual observation values and target values is not within an acceptable range.

Control value correction is carried out next in order to bring the virtual observation values closer to the target values. In the configuration illustrated in FIG. 1, this is done by control value correction unit 4 of virtual engine test device 1. Also, in the flow chart illustrated in FIG. 3, this corresponds to obtaining virtual ECU control values by simulation (Step S5). FIG. 8 shows control values before (solid line) and after (dotted line) correction. The correction is performed by an operator.

In the present embodiment, two methods are used for control value correction. The first one is a method, in which changes are made to the control values themselves using operator terminal 6. The second one is a method, in which control values supplied to the transient engine model, such as those shown in FIG. 8, are displayed on operator terminal 6 as time-series data, after which the control values in the displayed time series are corrected and supplied to the transient engine model. In other words, the operator issues instructions so as to increase or decrease control values directly, using a mouse etc., by modifying a graph such as the one shown in FIG. 8, which is displayed on the display of operator terminal 6. By doing so, the operator can make changes to the control values while visually recognizing changes to the shape of the graph (for instance, the dotted line in FIG. 8).

The thus modified control values are again supplied to the virtual ECU held in virtual ECU holding unit 3 (S6) and evaluation is carried out (S7). As a result, when the difference between the virtual observation results and the target results is within an acceptable range, the corrected control values are inputted to ECU 11 of vehicle transient test device 10. By doing so, real engine 12 is controlled using the corrected control values.

Next, the Steps S1, S2, and S3 of the flow chart illustrated in FIG. 3 are executed again. As a result, the Steps S1 to S7 are repeatedly executed until the difference between the observation values and target values fall within an acceptable range. A real engine ECU control software program is created when evaluation in Step S3 finds that the observation values and target values are within an acceptable range. In the configuration illustrated in FIG. 1, this is done by control value correction unit 4 of virtual engine test device 1. Also, in the flow chart illustrated in FIG. 3, this corresponds to real engine ECU control software creation (Step S8).

By doing so, it is possible to quickly produce control values, at which the difference between the observation values and target values are within an acceptable range.

INDUSTRIAL APPLICABILITY

In the present invention, engine control values that satisfy performance targets can be acquired within a short period of time and transient testing can be conducted in a transient state without substitution of steady-state test data. In addition, it allows for a reduction in the number of man-hours needed for creating control software for an engine satisfying the performance targets, as well as allows for easily creating control software for an engine control circuit. The present invention can reduce the time needed for engine development and can reduce the duration of product development.

Especially, with the present invention, the required time for creating transient engine models can be reduced, since it is possible to cope with a plurality of standardized transient operation modes.

The invention claimed is:

1. A transient engine performance adaptation method executing the steps of:
   conducting transient testing, during which an engine is operated in a transient state by making changes to control values of control factors supplied to the engine and its output is captured;
   capturing engine output data produced by the transient testing and creating a transient engine model of the tested engine based on the relationship between the output data and data concerning the control factors supplied to the engine;
   obtaining control values of control factors that satisfy transient performance targets required of said engine, using the transient engine model that has been created;
   confirming whether the required transient performance targets are satisfied by conducting transient testing by supplying the control values obtained from the transient engine model to the real engine; and
   creating control software for a control circuit controlling the engine if the confirmation step finds that the required transient performance targets are satisfied,
   wherein the transient performance targets are set on a condition that the step of conducting the transient testing is executed by changing control values of the control factors in accordance with a prescribed standardized transient operation mode, and
   the step of conducting the transient testing is executed, when there are a plurality of the prescribed standardized transient operation modes, in a single transient operation mode that covers changing patterns of control values of the control factors of the plurality of transient operation modes.

2. The transient engine performance adaptation method according to claim 1,
   wherein for each of the plurality of transient operation modes, a data distribution range to be focused on of the engine output data produced by the transient testing is specified, and
   the step of creating a transition engine model executes a step of capturing only data in the data distribution range to be focused on.

3. A transient engine performance adaptation system comprising:
   real engine transient test execution means for conducting transient testing by making changes to control values of control factors of an engine;
   transient engine model creation means for capturing engine output data obtained by the transient testing and creating a transient engine model describing the relationship between control input and the output data of the engine based on said output data and the control values supplied to said engine by the real engine transient test execution means;
   transient engine model simulation means for obtaining control values of the control factors, at which the transient engine model satisfies transient performance targets required of the engine during transient testing, using the transient engine model created by the transient engine model creation means; and
   means for supplying the real engine transient test execution means with the engine control values satisfying the transient performance targets obtained by conducting the simulation using the simulation means,
   wherein the transient performance targets are set on a condition that the real engine transient test execution means conducts transient testing by changing control values of the control factors in accordance with a prescribed standardized transient operation mode, and
   the real engine transient test execution means is provided with means for conducting, when there are a plurality of the prescribed standardized transient operation modes, the transient testing in a single transient operation mode that covers changing patterns of control values of the control factors of the plurality of transient operation modes.

4. The transient engine performance adaptation method according to claim 3,
   wherein for each of a plurality of transient operation modes, a data distribution range to be focused on in the engine output data produced by the transient testing is specified, and
   the transient engine model creation means is provided with means for capturing only data in the data distribution range to be focused on.

* * * * *